(12) United States Patent
Van Hattum

(10) Patent No.: US 12,275,863 B2
(45) Date of Patent: Apr. 15, 2025

(54) CONDUCTIVE COATING COMPOSITION AND HEATING SYSTEM

(71) Applicant: TIC TECHNOLOGY INNOVATION COMPETENCE GMBH, Heikendorf (DE)

(72) Inventor: Edgar Johannes Van Hattum, Bergen (DE)

(73) Assignee: TIC TECHNOLOGY INNOVATION COMPETENCE GMBH, Heikendorf (DE)

( * ) Notice: Subject to any disclaimer, the term of this patent is extended or adjusted under 35 U.S.C. 154(b) by 0 days.

(21) Appl. No.: 18/016,984

(22) PCT Filed: Jul. 16, 2021

(86) PCT No.: PCT/EP2021/070032
§ 371 (c)(1),
(2) Date: Jan. 19, 2023

(87) PCT Pub. No.: WO2022/017985
PCT Pub. Date: Jan. 27, 2022

(65) Prior Publication Data
US 2023/0279241 A1 Sep. 7, 2023

(30) Foreign Application Priority Data
Jul. 20, 2020 (EP) .................................. 20186726

(51) Int. Cl.
*C09D 5/24* (2006.01)
*C08K 3/04* (2006.01)
*C08K 3/34* (2006.01)
*C09D 5/26* (2006.01)
*C09D 7/40* (2018.01)
*C09D 7/61* (2018.01)

(52) U.S. Cl.
CPC ............... *C09D 5/24* (2013.01); *C08K 3/042* (2017.05); *C08K 3/34* (2013.01); *C09D 7/61* (2018.01); *C09D 7/69* (2018.01); *C08K 2201/001* (2013.01); *C08K 2201/005* (2013.01)

(58) Field of Classification Search
CPC ... C09D 5/24; C09D 7/69; C09D 7/61; C08K 3/042; C08K 3/34; C08K 2201/001; C08K 2201/0055
See application file for complete search history.

(56) References Cited

U.S. PATENT DOCUMENTS 1,762,990 A * 6/1930 Jones ...................... H01B 1/18
427/101
3,389,964 A * 6/1968 Olstowski ............. C04B 35/522
252/378 R
7,338,591 B2 * 3/2008 Vælitalo ................. C23F 13/16
205/734
8,888,904 B2 * 11/2014 Lee .......................... A62C 3/00
252/601
2014/0138572 A1 * 5/2014 Lee .......................... A62C 3/00
252/74
2015/0337105 A1 * 11/2015 Takahashi ............... B32B 27/08
428/688

FOREIGN PATENT DOCUMENTS

| CN | 104693922 A | * | 6/2015 |
| CN | 105161696 B | | 11/2017 |
| CN | 106146886 B | | 2/2019 |
| CN | 110401990 A | | 11/2019 |
| DE | 102007043447 A1 | | 3/2009 |
| DE | 20 2016 106 096 U1 | | 11/2016 |
| DE | 20 2019 105 756 U1 | | 3/2020 |
| GB | 1473947 A | | 5/1977 |
| GB | 2118534 A | | 11/1983 |
| JP | 2011-189700 A | | 9/2011 |
| RU | 2013889 C1 | | 5/1994 |

OTHER PUBLICATIONS

Balasubramaninan et al., Chemie des Graphens, Chemie in unserer Zeit, 45:240-249 (2011).
International Application No. PCT/EP2021/070032, International Search Report, mailed Oct. 25, 2021.
Ruiz-Hitzky et al., Clay-graphene nanoplatelets functional conducting composites, Advanced Functional Materials, 26(41):7394-405 (Nov. 2016).
Seiler et al., Effect of friction on oxidative graphite intercalation and high-quality graphene formation, Nat. Commun., 9(1):836 (Feb. 2018).
European Patent Application No. 20186726.4, Search Report and Written Opinion, mailed Dec. 18, 2020.
International Application No. PCT/EP2021/070032, International Preliminary Report on Patentability, dated Feb. 2, 2023.

* cited by examiner

*Primary Examiner* — Haidung D Nguyen

(74) *Attorney, Agent, or Firm* — MARSHALL, GERSTEIN & BORUN LLP

(57) ABSTRACT

The present invention relates to a conductive coating composition (known as heating paint) having high efficiency, which composition can be applied to substrate surfaces for efficient generation of heat from electrical energy, and to a method for the production thereof. The conductive coating composition comprises a silicate salt and particles of expanded graphite which are dispersed in the silicate salt, wherein the graphite is present in a hexagonal and/or rhombohedral crystal structure having crystal lattice planes extending in parallel and silicon is embedded between the crystal lattice planes of the graphite.

11 Claims, 2 Drawing Sheets

CONDUCTIVE COATING COMPOSITION AND HEATING SYSTEM

FIELD OF THE INVENTION

The present invention relates to a conductive coating composition (so-called heating paint) having high efficiency, which can be applied to substrate surfaces for efficient generation of heat from electrical energy, and to a method for the production thereof.

BACKGROUND OF THE INVENTION

The heating of the surface of a substrate is necessary in various applications, wherein frequently electric wall or floor heating devices which, for example, comprises meandering heating wires or water-assisted wall or floor heating devices in which heated water circulates are used for heating rooms. The use of a conductive coating, usually containing one or more conductive additives for application to walls or floors is also fundamentally known.

DE 20 2019 105 756 U1 discloses a heatable, multi-layer composite system which in particular is suitable for dry construction which comprises a (1.) construction board, preferably gypsum board, e.g. gypsum plasterboard, gypsum fibre board, chipboard, wooden board, MDF board, OSB board, hard PVC board, polystyrene board, building panel, e.g. tiling board, tile laying board, thermal board, thermal panel, thermal fleece, interior insulation board, climate board or acrylic glass; (2.) a conductive coating (heating paint), preferably at least one conductivity additive selected from conductivity additives comprising graphite, graphene and carbon black, and at least one binder, wherein the binder comprises an electrically non-conductive polymer or an inorganic binder, more preferably the heating paint comprises at least two conductivity additives selected from conductivity additives comprising graphite, graphene and carbon black, and at least one binder, wherein the binder comprises an electrically non- conductive polymer or an inorganic binder, wherein more preferably the heating paint comprises at least two conductivity additives selected from conductivity additives comprising graphite, graphene and soot and the heating paint is free from electrically conductive carbon fibres and carbon nanotubes, and further comprises (3.) at least two electrically conductive contact elements.

A similar heating paint is described in DE 20 2016 106 096 U1. This comprises at least two conductivity additives and at least one binder, wherein the conductivity additives comprise graphite and/or carbon black and the binder comprises an electrically non-conductive polymer.

In addition to diamond and fullerene, graphite is the third stable modification of carbon under normal conditions and crystallizes mostly in the hexagonal system, more rarely in the rhombohedral crystal system. Planar layers, the "basal planes" or "graphene layers" are present in crystalline graphite. A layer consists of covalently linked hexagons whose carbon atoms are $sp^2$ hybridized. Graphite possesses a really good thermal and electrical conductivity along the graphene layers. The conductivity along the graphene layers is made possible by the delocalization of the $\pi$-electrons. Orthogonally to the graphene layers, however, graphite is an insulator. Real graphitic carbons however frequently have a lower crystallinity with variously strongly defined disorders. These range from a turbostatic structure in which a predominantly planar alignment of the carbon layers is present, up to a structure designated as amorphous in which the crystalline regions do not exceed a size of 10 nm.

Graphene consists of only one layer of such carbon atom layers arranged in a honeycomb shape and can be obtained by mechanical or chemical exfoliation or by delamination of graphite, for example, by means of intercalation and oxidation by sulphuric acid and subsequent reductive defunctionalization. See on this matter, for example, K. Balasubramaninan et al. "Chemistry of graphene", Chemistry in our time, 2011, 45, pages 240 to 249; or S. Seiler et al. "Effect of friction on oxidative graphite intercalation and high-quality graphene formation", Nature Communications 2018, DOI: 10.1038/s41467-018-03211-1. The electrons of graphene have an exceptional mobility as charge carriers. The material shows unusual quantum Hall effects and this also comprises a semiconductor with the band gap 0 which is why the charge carriers can be displaced continuously between electron and hole.

A disadvantage of the usual heating paints comprising conductivity additives which comprise graphite, graphene and/or carbon black in an electrically non-conductive binder is their comparatively low yield during conversion from electrical into thermal energy.

SUMMARY OF THE INVENTION

The object of the present invention is therefore to provide a heating system with high efficiency for surfaces and rooms and a corresponding conductive coating composition (heating paint) for surfaces and a method for the production thereof.

These objects are solved according to the invention by the subject matters described in the independent claims. Preferred embodiments of the invention are described in the dependent claims.

According to one embodiment, the invention relates to a conductive coating composition comprising a silicate salt and particles of expanded graphite which are dispersed in the silicate salt, wherein the graphite is present in a hexagonal and/or rhombohedral crystal structure with parallel-running crystal lattice planes and silicon is embedded between the crystal lattice planes of the graphite.

The choice of silicate salts is not particularly restricted. Any water-soluble silicate salts can be used as silicate salt. Lithium, sodium and/or potassium salts are preferably used, quite particularly preferably in the form of water glass. Examples of silicate salts are lithium, sodium and/or potassium water glass. According to one embodiment of the invention, the weight ratio of graphite to silicate relative to the $SiO_2$ content of the silicate is 10:1 to 1:2, preferably 5:1 to 1:1.5 and more preferably 2:1 to 1:1.

According to one embodiment of the invention, the particles of expanded graphite of the composition according to the invention are present in the form of lamellar particles. Lamellar particles in the sense of this invention are particles having a defined aspect ratio of about 10 to about 500, preferably of about 20 to about 400. The aspect ratio is understood as the quotient of the length and the height of the plate crystal.

The conductive coating composition according to the invention can be provided as an aqueous suspension which is provided for coating on a substrate surface. Once the suspension is dried, e.g. after coating on a substrate surface, it is hydrophobic, i.e. water-repellent. It has been shown that the conductive coating composition according to the invention also adheres very well to surfaces with the addition of adhesion promoters, in particular on porous surfaces, for example, of tiles or the like. According to a further embodiment, the conductive coating composition is provided in dried form on a substrate surface. Suitable substrates are, for example, construction boards such as gypsum boards, e.g. gypsum plasterboards, gypsum fibre boards, chipboards, wooden boards, MDF boards, OSB boards, hard PVC boards, polystyrene boards, building panels, e.g. tiling boards, tile laying boards, thermal boards, thermal panels, thermal fleece, interior insulation boards, climate boards or acrylic glass.

According to a further embodiment of the present invention, the coating composition can, however, further comprise a matrix polymer. This is particularly preferred if the adhesion on non-porous surfaces such as metals is to be improved.

Preferably thermoplastics or resins are used as matrix polymers which are also designated as binders. Suitable polymers comprise but are not restricted to: polyamides such as polyamide 6 or polyamide 12; acrylic polymers such as polybutyl acrylate (PBA) or polyethylacrylate (PEA); and epoxy resins. The purpose of the matrix polymers is primarily to ensure a permanent contact between substrate surface and coating. Biologically degradable or natural polymers which have a certain adhesiveness can also be used.

According to a further embodiment, the invention relates to a method for producing a conductive composition to generate heat from electrical energy (heating paint) in which a mixture of graphite and a silicate salt is produced in an aqueous solvent, the mixture is electrolyzed to activate the surface and form an intercalation compound by applying an electrical voltage and the reaction product of the electrolysis is separated from the reaction solution. Preferably direct current is supplied in this case.

Graphite is preferably used in the form of natural graphite flakes. The particle size (d50) of the graphite is preferably 1 μm to 300 μm, more preferably 20 μm to 250 μm and in particular 100 μm to 200 μm. The determination of the particle size in the silicate salt can be accomplished by means of imaging methods such as electron microscope photographs of a cross-section of a sample.

Any water-soluble silicate salts described above can be used as silicate salt. According to one embodiment of the invention, the weight ratio of graphite to silicate in the mixture in the aqueous solvent relative to the $SiO_2$ content of the silicate, is 10:1 to 1:2, preferably 5:1 to 1:1.5 and more preferably 2:1 to 1:1. According to a further embodiment of the invention, the reaction takes place in the presence of an acid such as $H_2SO_4$ or $HNO_3$.

The electrolysis can be carried out potentiostatically or galvanostatically. In one embodiment of the invention, the reaction takes place whilst supplying a total amount of power of at least 200 mA·h/g, relative to the weight content of graphite, preferably in the range of 300 to 600 mA·h/g, relative to the weight content of graphite.

According to one embodiment of the present invention, the electrolysis is carried out potentiostatically, i.e. at a constant electric potential, wherein the applied electric potential can nevertheless be varied in stages during (a) activation of the solution and (b) to form the intercalation compound. The applied electric potential preferably lies in the range of 1.0 V to 3.0 V. It is preferred that the applied electric potential in stage (a) exceeds the applied electric potential in stage (b) by at least 1.1 times. In one embodiment of the invention, the applied electric potential in stage (a) is 1.8 V and 3.0 V, preferably 2.1 V to 2.5 V and in stage (b) 1.0 to 2.0 V, preferably 1.6 to 2.0 V, wherein the electric potential applied in stage (a) exceeds the electric potential applied in stage (b) by 1.1 times, preferably by 1.1 times to 1.7 times. In another embodiment of the invention the applied electric potential in stage (a) is 2.1 V to 2.5 V and in stage (b) 1.5 to 1.8 V. The duration of the supply of electric current in stage (a) is about 10 sec to about 600 sec and for stage (b) about 3 min to about 60 min. Preferably direct current is supplied.

According to another embodiment of the present invention, the electrolysis is carried out galvanostatically, i.e. at a constant current intensity, wherein in this case the supplied current intensity can nevertheless be varied in stages during (a) activation of the solution and (b) to form the intercalation compound. Thus, it is preferable if the supplied current intensity in stage (a) exceeds the supplied current intensity in stage (b) at least by 1.1 times, preferably by 1.1 times to 3.2 times. In one embodiment of the invention, the supplied current intensity in stage (a) is 300 to 500 mA·h/g relative to the weight content of graphite at a potential of up to 2.5 V and in stage (b) 100 to 160 mA·h/g V at a potential of up to 2.3 relative to the weight content of graphite. Preferably direct current is supplied.

Without wishing to be bound to a particular theory, it is assumed that during the supply of electrical energy in aqueous solution in a first stage, the surface of the graphite particles becomes charged and then oxygen-containing functional groups similarly as in graphene oxide are formed, wherein the graphite particles are activated. These enable the intercalation of $SiO_2$ in graphite in a second stage, wherein the Si of the $SiO_2$ is also partially reduced and elementary silicon can be embedded between the graphite layers of the graphite which interconnects various graphite layers. Furthermore, during the supply of electrical energy at the surface of the graphite particles, phases having a rhombohedral lattice structure are formed which can also be embedded as clusters between the graphite layers of the graphite and also connect hexagonal graphite crystals to one another. It was observed that the particles formed have an extraordinary heat output in the orthogonal direction to the graphene layers which could be explained by the intercalation of the silicon in the graphene layers an in part also by clusters of rhombohedral structure between the graphene layers.

The subject matter of the present invention is also a conductive composition for generating heat from electrical energy (heating paint) which can be produced according to the methods described in the previous or following embodiments.

DETAILED DESCRIPTION OF THE INVENTION

Figure 1:
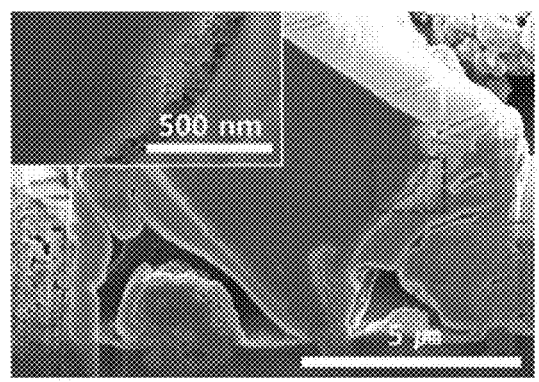
FIG. 1 shows a first electron micrograph through a first cross-section of a first coating composition according to the invention.
Figure 2:
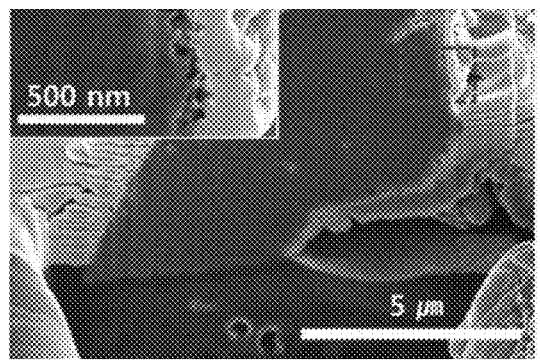
FIG. 2 shows a second electron micrograph through a second cross-section of the first coating composition according to the invention.
Figure 3:
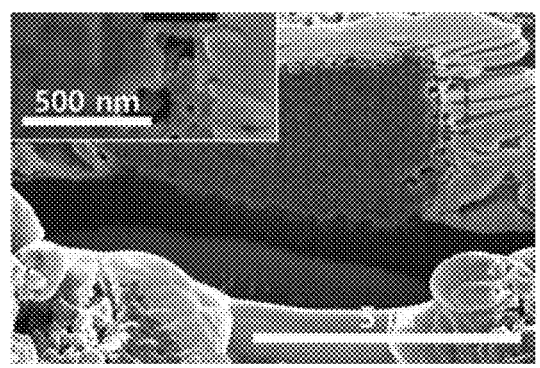
FIG. 3 shows an electron micrograph through a third cross-section of the first coating composition according to the invention.

In one embodiment of the invention the composition according to the invention is present in the form of expanded particles. In one embodiment of the invention the particles have a bulk density between 0.01 kg/L and 0.1 kg/L, preferably between 0.02 kg/L and 0.05 kg/L. In a further embodiment of the invention the particles have pore sizes of 10 μm-100 μm.

In order to produce the expanded particles, the intercalation compound formed by the power supply is eluted with water, the eluted particles of the intercalation compound are dried and subjected to a thermal treatment in which the graphite expands. Preferably temperatures of 130° C. or higher, particularly preferably temperatures of 150° C. to 260° C., in particular 150° C. to 180° C. are used for the expansion.

Preferably thermoplastics or resins are used as matrix polymers which are also designated as binders. Suitable polymers comprise but are not restricted to: polyamides such as polyamide 6 or polyamide 12; acrylic polymers such as polybutyl acrylate (PBA) or polyethylacrylate (PEA); and epoxy resins. The purpose of the matrix polymers is primarily to ensure a permanent contact between substrate surface and coating. Biologically degradable or natural polymers which have a certain adhesiveness can also be used.

According to a further embodiment, the present invention relates to a substrate which is coated with particles of the conductive composition according to the invention on a surface thereof. According to one embodiment the particles are distributed in a polymer matrix.

The coating can take place in any manner, for example, by application by means of a brush or a spatula, by spray coating or dip coating and subsequent drying of the coating. Before complete drying, at least two wires, preferably copper wires, are inserted in the coating, which act as anode or cathode to conduct electrical energy. The thickness of the coating on the substrate is preferably 10 μm to 40 μm. In this case a sheet resistance of 10 Ohm to 20 Ohm is preferably achieved.

The composition according to the invention is per se current-conducting and exhibits excellent properties in the conversion of power into heat output. It is preferably used in low-voltage applications but can also be used in alternating voltage applications. Preferably the composition according to the invention or the heating system according to the invention which comprises a composition coated on a substrate is used in 24V/48 V DC applications. The substrates thus coated can thus be used very efficiently as heating for surfaces and rooms.

EXAMPLES

Example 1

In an electrolyzer which comprises an anode working chamber disposed between the current drain of the anode and a movable piston with a diaphragm, and a cathode disposed in the electrolyte above the piston, 25 ml of 58% $HNO_3$ and 10 g of natural graphite having the following particle size composition: 80% 200-290 μm and 20% less than 200 μm were added. For this purpose 10 g of potassium water glass solution was added. An anodic treatment of the graphite was carried out after the potentiostatic procedure. At stage (b) (activation of the surface) a potential $E_b$=2.1 V was predefined in the course of 15 s. Thereafter, stage (c) of the electrochemical treatment to produce GEV at the potential $E_c$=1.75 V was carried out for 5 hours at Q=400 mA·h/g graphite. The pressure on the piston was 0.2 kg/cm². The product obtained was eluted with water, dried and thermally treated at 200° C. An expanded graphite embedded in potassium water glass (dispersion graphite) having a bulk density of 1.7 g/l was obtained.

Example 2

A mixture of natural graphite and water glass was produced as described in Example 1, wherein however graphite powder having an average particle size of 200 μm was used, The anodic treatment was carried out in acid having a concentration of 35 to 40% in two stages, with Q of 300 to 420 mA·h/g graphite and foam formation temperatures of 200 to 250° C.

Example 3

In the working chamber of an electrolyzer disposed between the anode and the cathode having a closely adjacent separator of polypropylene fabric, 2 kg of a mixture of graphite with 80% sulphuric acid was added, which was taken in a ratio of 1:1.6. To this was added 1 kg of potassium water glass solution.

The graphite suspension was treated anodically after the galvanostatic procedure. Step (b) (activation of the surface) was carried out under action of a current of 160 mA/g until the anode potential $E_b$=2.3 V was reached (in the course of approximately 2 hours), then stage (c) (formation of GEV) was carried out whilst reducing the current to about 80 mA/g. The voltage at the electrolyzer varied during the synthesis process within the limits of 3.5-4.5 V. The total time of the treatment was 9 hours, Q=450 m·Ah/g graphite. The pressure on the piston was 0.2 kg/cm².

The product obtained was then eluted with water, dried and treated at 250° C. A dispersion graphite having a bulk density of about 1.6 g/l was obtained.

Example 4

The anode treatment of the graphite suspension in 70% sulphuric acid which was taken in a ratio of 1:1.6 was carried out in agreement with Example 3. When the potential of 2.1 V was reached, the amount of current was reduced, stage (c) was initiated at E=1.8 V. The total time of the treatment is increased to 10 hours, Q=520 mA·h/g graphite.

The product obtained was eluted with water, dried and thermally treated at 200° C. A dispersion graphite having a bulk density of 2.0 to 2.20 g/l was obtained.

Example 5

The anode treatment of the graphite suspension in 60% sulphuric acid which was taken in a ratio of 1:1.5 was carried out in agreement with Example 3 but the initial polarization current was 80 mA/g graphite at the activation stage and upon reaching the potential of 1.9-2.0 V the amount of current was reduced. The treatment was then carried out at E=1.7 V with a current of 40 mA/g graphite.

The total time of the treatment was increased to 12 hours, Q=480-500 mA·h/g graphite. The product obtained was eluted with water, dried and thermally treated at 200° C. A dispersion graphite having a bulk density of 2.2 g/1 was obtained.

Example 6

Figure 4:
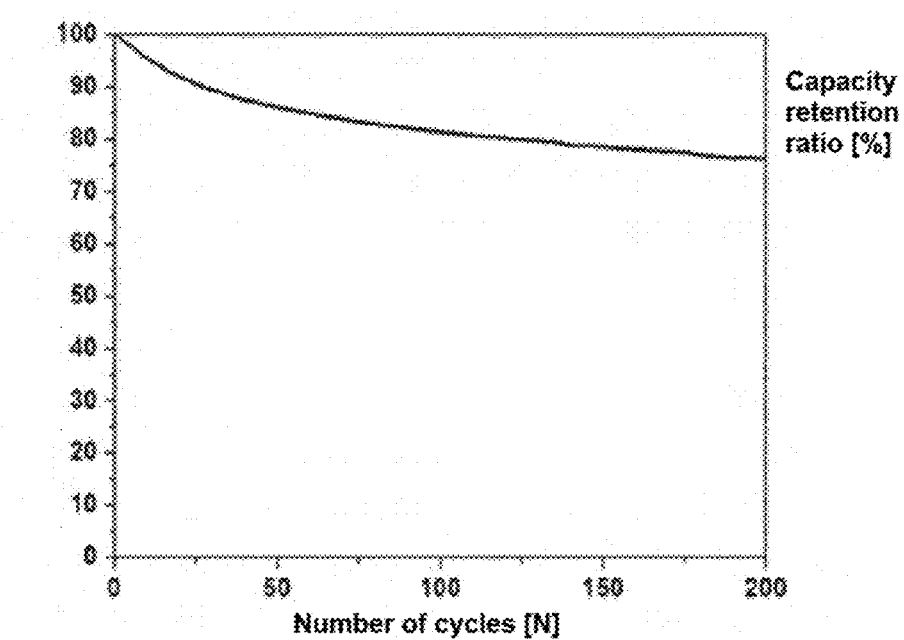
FIG. 4 shows the retention of the electrical capacity of the first coating composition according to the invention.

The electrical capacity of a first coating composition according to the invention was determined in several cycles. The relative decrease in the electrical capacity over the cycles is shown in FIG. 4.

The invention claimed is:

1. Method for producing a conductive composition for generating heat from electrical energy (heating paint), comprising: forming a mixture of graphite and a silicate salt in an aqueous solvent, electrolyzing the mixture, by applying an electrical voltage originating from a power supply, to activate a surface of the graphite and form an intercalation compound, and separating the reaction product of the electrolysis from the reaction solution.

2. Method according to claim 1, wherein a total amount of power of at least 200 mA·h/g, relative to a weight content of graphite in the mixture, is supplied to the mixture.

3. Method according to claim 1, wherein an applied electric potential of the power supply lies in the range between 1 V and 3 V.

4. Method according to claim 1, wherein the power supply is accomplished in a potentiostatic operating mode in stages, and wherein an applied electric potential of a first stage exceeds an applied potential of a second stage by at least 1.1 times.

5. Method according to claim 4, wherein the applied electric potential of a first stage is 2.1 V to 2.5 V and in a second stage is 1.5 to 1.8 V.

6. Method according to claim 5, wherein a supplied amount of power of a first stage is 300 to 500 mA·h/g relative to the weight content of graphite at a potential of up to 2.5 V, and of a second stage is 100 to 160 mA·h/g, at a potential of up to 2.3 V relative to the weight content of graphite.

7. Method according to claim 1, further comprising drying and expanding the reaction product separated from the reaction solution by supplying thermal energy.

8. Method according to claim 7, wherein temperatures of 130° C. or higher are applied.

9. Method according to claim 7, wherein temperatures of 150° C. to 260° C. are applied.

10. Method according to claim 7, wherein temperatures of 150° C. to 180° C. are applied.

11. Method according to claim 1, wherein a total amount of power in the range of 300 to 600 mA·h/g, relative to a weight content of graphite in the mixture is supplied to the mixture.

* * * * *